United States Patent
Burgfels et al.

(10) Patent No.: US 7,229,941 B2
(45) Date of Patent: Jun. 12, 2007

(54) CATALYSTS BASED ON CRYSTALLINE ALUMINOSILICATE

(75) Inventors: Götz Burgfels, Bad Aibling (DE); Karl Kochloefl, Rosenheim (DE); Jürgen Ladebeck, Louisville, KY (US); Michael Schneider, Ottobrunn (DE); Friedrich Schmidt, Rosenheim (DE); Hans-Jürgen Wernicke, Wolfratshausen (DE); Josef Schönlinner, Obing (DE)

(73) Assignee: Sud-Chemie AG, Munich (DE)

( * ) Notice: Subject to any disclaimer, the term of this patent is extended or adjusted under 35 U.S.C. 154(b) by 521 days.

(21) Appl. No.: 10/725,313

(22) Filed: Dec. 1, 2003

(65) Prior Publication Data

US 2004/0138053 A1 Jul. 15, 2004

(51) Int. Cl.
*B01J 29/06* (2006.01)

(52) U.S. Cl. ............................ 502/64; 502/60; 502/63; 502/69; 502/70; 502/73; 502/77

(58) Field of Classification Search .................. 502/60, 502/63, 69, 70, 73, 77, 64
See application file for complete search history.

(56) References Cited

U.S. PATENT DOCUMENTS

| | | | |
|---|---|---|---|
| 3,702,886 A | 11/1972 | Argauer | |
| 3,926,782 A | 12/1975 | Rosinski | |
| 4,025,572 A | 5/1977 | Lago | |
| 4,206,085 A | 6/1980 | Brady | |
| 5,063,187 A | 11/1991 | Schmidt | |
| 5,120,693 A * | 6/1992 | Connolly et al. | ............. 502/64 |
| 5,981,819 A | 11/1999 | Moeller | |
| 2003/0149322 A1 | 8/2003 | Koss | |

FOREIGN PATENT DOCUMENTS

| | | |
|---|---|---|
| DE | 3537459 | 4/1987 |
| DE | 10027159 | 12/2001 |
| EP | 123449 | 10/1984 |
| EP | 173901 | 3/1986 |
| EP | 448000 | 9/1991 |
| EP | 490435 | 12/1991 |
| GB | 2018232 | 10/1979 |
| GB | 1601915 | 11/1981 |

* cited by examiner

*Primary Examiner*—Elizabeth D. Wood
(74) *Attorney, Agent, or Firm*—Scott R. Cox

(57) ABSTRACT

A catalyst is described based on crystalline aluminosilicates of the pentasil type, characterized in that it is constructed from primary crystallites with an average diameter of at least 0.01 μm and less than 0.1 μm, that are combined to at least 20% to agglomerates of 5 to 500 μm, in which the primary crystallites or agglomerates are bonded together by finely divided aluminum oxide, that its BET surface is 300 to 600 $m^2/g$ and its pore volume (determined according to mercury porosimetry) is 0.3 to 0.8 $cm^3/g$, that it is present in H form and that the amount of finely divided aluminum oxide binder is 10 to 40 wt. %, referred to the total weight of the aluminosilicate, in which the finely divided aluminum oxide binder is used in the reaction charge as peptizable aluminum oxide hydrate, sodium aluminate being used as aluminum and alkali source, and primary synthesis of the crystalline aluminosilicate occurs without addition of acid. A method is also described for production of such a catalyst and its preferred applications.

23 Claims, No Drawings

CATALYSTS BASED ON CRYSTALLINE ALUMINOSILICATE

The invention concerns catalysts based on crystalline aluminosilicates of the pentasil type.

Catalysts based on crystalline aluminosilicates produced from a source of aluminum, a source of silicon, a source of alkali, a template (for example, a tetrapropylammonium compound) and water are known from U.S. Pat. No. 3,702,886. Catalyst with an Si/Al atomic ratio of at least 10 with the size of the primary crystallite being at least 0.1 micron and at most 0.9 micron are disclosed by U.S. Pat. No. 5,063,187.

Production of methanol conversion catalysts based on crystalline aluminosilicates is known from DE-A-28 22 725. The diameter of the primary crystallites is 1 μm and more. Production of primary crystallites with diameters well above 1 μm is aimed at. For this purpose, crystal growth must be promoted by higher temperatures and nucleus formation inhibited by low concentrations of the template essential for crystallization of zeolites. In addition, there is no mention of the use of binders or the size of the agglomerates.

According to DE-A-24 05 909 (FR-A-2 217 408), catalysts for hydrocarbon conversion are produced based on zeolites of the ZSM-5 type, in which the average diameter of the primary crystallites lies in the range from 0.005 to 0.1 μm. Agglomerates on the order of 0.1 to 1 μm are produced from the primary crystallites. To produce the catalysts, the agglomerates are mixed with aluminum oxide as a binder. Other binders are mentioned as equivalent. There is no data on the particle size of the binder. In addition, synthesis was conducted in the presence of sulfuric acid, using $Al_2(SO_4)_3 \cdot xH_2O$.

According to DE-A-29 35 123, ZSM-5 or ZSM-11 zeolites are prepared, using ammonium hydroxide and an alcohol as template, in which the presence of nuclei is characteristic. The zeolites are used as cracking and hydrocracking catalysts and as catalysts for isomerization and dewaxing. Aluminum oxide can be used as binder. However, there are no data on the size of the primary crystallites or of the agglomerates and binder.

A method for production of zeolites and their use as catalysts for conversion of aliphatic compounds to aromatic hydrocarbons is described in DE-A-29 13 552. A mixture of butanol and ammonium hydroxide is used as template. The size of the primary crystallites is supposed to be less than 3 μm, preferably less than 2 μm. A lower limit is not stated. Aluminum oxide, among others, can be used as a binder for the agglomerate. However, no particle sizes are mentioned for the agglomerates and binder.

A method for production of large evenly shaped crystals of zeolites of the pentasil type from $SiO_2$ and a compound of one or more trivalent elements, like Al, B, Fe, Ga, Cr, in amine-containing solutions is known from DE-A-35 37 459, characterized in that highly dispersed $SiO_2$, prepared by burning of a silicon chloride compound, is used as the $SiO_2$-containing starting material. The zeolites are used for conversion of organic compounds, especially for conversion of methanol to hydrocarbons containing lower olefins and aromatics. The obtained zeolites are not agglomerated.

EP-A-173 901 concerns a method for production of small zeolite crystallites of the ZSM-5 type with an $SiO_2/Al_2O_3$ molar ratio of more than 5, corresponding to an Si/Al atomic ratio of more than 2.5. The smallest dimension of the crystallites is below 0.3 μm. The crystallites are subjected to an ion exchange reaction and, after mixing with a matrix material, are formed into larger particles. These are dried and calcined, obtaining catalysts for different hydrocarbon conversion reactions. No comments are found concerning the type and effect of the matrix material.

EP-A-123 449 describes a method for conversion of alcohol or ethers to olefins, using zeolites catalysts treated with steam; these have a crystal size of less than 1 μm and can be incorporated in a matrix. Clay, silica and/or metal oxide are mentioned as matrix materials.

U.S. Pat. No. 4,206,085 concerns hydrocarbon conversion catalysts based on zeolites and a matrix material to increase abrasion resistance. Aluminum oxide from pseudoboehmite and $SiO_2$ from ammonium polysilicate or silica sol is used as a matrix material. The preferred zeolites belong to the faujasite type. No comments are made concerning the size of the zeolites crystals.

U.S. Pat. No. 4,025,572 concerns a method for production of specific hydrocarbon mixtures, in which the catalyst bed contains zeolite, among other things. Synthesis of the zeolite is run in the presence of sulfuric acid, using $Al_2(SO_4)_3 \cdot xH_2O$. According to one example, the zeolite catalyst is mixed with 90 wt. % aluminum oxide and pelletized.

EP 0 362 364 A1 concerns catalysts based on crystalline aluminosilicates of the pentasil type with an Si/Al atomic ratio of at least 10, based on primary crystallites with an average diameter of at least 0.1 μm and, at most, 0.9 μm. The size of the primary crystallites is considered important for the lifetime of the catalyst. The same applies for EP 0 448 000 A1. A methanol to olefin process and an olefin to diesel process are mentioned as application examples.

The object of the present invention, is to prepare catalysts based on crystalline highly active aluminosilicates that exhibit increased activity and selectivity with very good lifetime, in catalytic processes, especially in the CMO (conversion of methanol to olefin) process or methanol to propylene (MTP) conversion processes and olefin to olefin (OTO) processes.

This object is achieved by the catalysts according to the invention.

It was surprisingly found that both excellent lifetime and excellent selectivity and activity of the catalysts according to the invention result when the average particle size of the primary crystallites of the crystalline aluminosilicates are in the range between about 0.01 and less than 0.1 μm in combination with the other features according to the invention.

If the primary crystallites are combined partly into agglomerates, they are only loosely bonded to each other, as in a filter cake, for example. The primary crystallites can be recovered relatively easily, for example, by dispersion of the filter cake in an aqueous medium and by agitation of the dispersion.

It is important that the primary crystallites have an average diameter of at least 0.01 μm and less than 0.1 μm. The average diameter of the primary crystallites preferably lies in the range from 0.01 to 0.06 μm. Particularly good results are obtained, if the average diameter of the primary crystallite lies in the range from 0.015 to 0.05 μm. If the average diameter is less than 0.01 μm, both the activity and lifetime of the catalysts are substantially reduced. The average diameter of the primary crystallites is defined as the arithmetic mean between the largest and smallest diameters of an individual crystallite, averaged over a large number of crystallites, determined by scanning electron microscopic investigations at a magnification of 80,000 (see below). This definition is relevant in crystallites with an irregular crystal habit, for example, in rod-like crystallites. In spherical or roughly spherical crystallites, the largest and smallest diameters coincide.

The values stated above for the primary crystallites are average dimensions (arithmetic mean from the largest and smallest dimensions, averaged over a number of crystallites). These values are determined with an LEO field emission scanning electron microscope (LEO Electron Microscopy, Inc., USA) by means of powder samples of the catalysts, redispersed beforehand in acetone, treated with ultrasound for 30 seconds and then applied to a support (probe current range: 4 pA to 10 nA). Measurement occurs at 80,000-fold magnification. The values could be confirmed at 253,000-fold magnification.

The primary crystallites and agglomerates are bonded to each other and formed into composites by finely divided aluminum oxide, which is preferably obtained by hydrolysis of organoaluminum compounds.

The composites generally have dimensions from 20 to 1000 μm, preferably 50 to 800 μm. These values are also average dimensions, defined as mentioned above.

It was surprisingly found that when the primary crystallite size so defined above is maintained, particularly good catalysts are obtained according to the invention, if the finely divided aluminum oxide binder is present in the reaction charge as a peptizable aluminum oxide hydrate, and the amount of aluminum oxide binder, referring to the total weight of the end product (catalyst) is at least 10 wt. % and does not exceed about 40 wt. %.

At least 95% of the particles of the peptizable aluminum oxide hydrate (referring to average diameter) are preferably less than or equal to 55 μm. The finely divided aluminum oxide binder is preferably obtained by hydrolysis of aluminum trialkyls or aluminum alcoholates.

The structure of the catalysts from primary crystallites, agglomerates and binder particles also determines the BET surface, determined according to DIN 66131 (300 to 600 $m^2/g$), the pore volume, determined according to the mercury porosimetry method according to DIN 66 133 (0.3 to 0.8 $cm^3/g$), as well as the pore diameter, i.e., at least 10%, preferably at least 20%, and especially at least 60%, of the pores preferably have a diameter from 14 to 80 nm.

The BET surface, the pore volume and pore diameter represent an optimal choice, in order to obtain catalysts with high activity, selectivity and lifetime.

The catalyst according to the invention is preferably characterized in that it is obtainable by a process according to the following steps:

(a) in an aqueous reaction batch containing a silicon source, an aluminum source, an alkali source and a template, an alkaline aluminosilicate gel is produced in a manner well known, such as in U.S. Pat. No. 3,702,886 and U.S. Pat. No. 5,063,787, at an elevated temperature and optionally an elevated pressure, and converted to a crystalline aluminosilicate, with the reaction being stopped when the obtained primary crystallites have an average diameter of at least 0.01 μm, but less than 0.1 μm, preferably from 0.01 to 0.06 μm, especially from 0.015 to 0.05 μm;

(b) the primary crystallites are separated from the aqueous reaction medium as preagglomerates, dried and subjected to intermediate calcining;

(c) the product from stage (b) is reacted in an aqueous medium with a proton-containing substance, or one that yields protons when heated, for exchange of the alkali ions, separated, dried and subjected again to intermediate calcining, whereupon an agglomerate fraction of about 5 to 500 μm is separated;

(d) the agglomerate fraction from stage (c) is mixed with the finely divided aluminum oxide hydrate;

(e) the product from stage (d) is subjected to final calcining.

The significance of the individual stages, according to which the catalyst according to the invention is obtained, is further explained below:

In stage (a), an aqueous reaction charge containing a silicon source (for example, colloidal silica or an alkali silicate), an alkali and an aluminum source (alkali aluminate, especially sodium aluminate) and a template is initially produced.

It was surprisingly found that particularly advantageous catalysts, especially for OTO and CMO or MTP methods, can be produced, when an alkali aluminate, especially sodium aluminate, is used as the alkali and aluminum source. No (separate) acid addition occurs according to the invention in stage (a) (primary synthesis of the crystalline aluminosilicate). In particular, in comparison to known methods, no mineral acids, like sulfuric acid, are used in the reaction charge during primary synthesis. The problems that arise during handling of (strong) acids are avoided and advantageous catalysts are obtained.

If the catalyst is to be used according to a particularly preferred embodiment of the invention in a CMO or MTP process, especially a process according to DE 100 27 159 A1, whose disclosure in this respect is hereby incorporated by reference, the weight fractions between silicon source and aluminum source are chosen such that crystalline aluminosilicates with an Si/Al atomic ratio between about 50 and 250, preferably about 50 and 150, especially about 75 to 120, are obtained.

If the finished catalyst according to another particularly preferred embodiment of the invention is prescribed for use in an OTO process, especially a process according to DE 100 00 889 A1, whose disclosure in this respect is hereby incorporated by reference, the weight fractions between the silicon source and the aluminum source are chosen so that crystalline aluminosilicates with an Si/Al atomic ratio between about 10 and 100, preferably between about 20 and 65, especially about 20 to 50, are obtained.

An alkaline aluminosilicate gel is produced in a well known manner from the reaction charge at elevated temperature, and optionally, elevated pressure. One can operate even at temperatures of 90° C., but in this case the reaction times are relatively long (about 1 week). It is therefore preferable to operate at temperatures from 90 to 190° C., especially from 90 to 150° C., in which an overpressure is automatically established as a function of temperature at temperatures of more than 100° C. (under standard conditions).

During the reaction, the aluminosilicate gel is converted to a crystalline aluminosilicate. If the temperature of the reaction charge is higher than 190° C., growth of the aluminosilicate primary crystallites is too rapid and unduly large primary crystallites are readily obtained, while aluminosilicate gel is still present in the reaction charge.

Tetralkylammonium compounds, preferably tetrapropylammonium hydroxide (TPAOH) or tetrapropylammonium bromide (TPABr) are used as templates. Mixtures of ammonia or an organic amine and another organic compound from the group of alcohols, preferably butanol, can also be used as template.

The aqueous reaction charge of stage (a) preferably has a pH value from 10 to 13. At a pH value of less than 10, conversion of the aluminosilicate gel to the crystalline aluminosilicate runs relatively slowly. At pH values higher than 13, the aluminosilicate crystals can redissolve in some cases.

Formation of the crystalline aluminosilicate primary crystallites can be controlled by appropriate choice of the silicon source, the aluminum source, the alkali source and the template, as well as by appropriate selection of the temperature and pH value and the mixing speed. It is essential that the reaction be interrupted, when the obtained primary crystallites have an average diameter of at least 0.01 µm and less than 0.1 µm, preferably in the range from 0.01 to 0.06 µm, especially from 0.015 to 0.05 µm.

Several test charges are run for this purpose. After only a few attempts, the optimal parameters can be determined, as a result of which the required size ranges of the primary crystallites are obtained. Another indication of termination of the reaction is an abrupt rise in the pH value of the reaction charge.

According to the invention, a new reaction charge need not be produced in each case. Instead, the silicon source, the alkali source, the aluminum source, the template and the water from the mother liquors of previous syntheses can be used to produce the aluminosilicate gel and be made up by the amounts of the mentioned compounds required for synthesis of the aluminosilicate gel.

Formation of the aluminosilicate primary crystallites from stage (a) occurs preferably at a pH value between 10 and 13, the reaction charge being agitated. In this manner, the size distribution of the primary crystallites is homogenized. The agitation speed, however, should preferably be no more than 900 rpm. At higher agitation speeds, the percentage of smaller primary crystallites is higher, which might be advantageous, under the provise that the average diameter of all primary crystallites is at least 0.01 µm.

In stage (b), the primary crystallites are separated from the aqueous reaction medium as preagglomerates, i.e., not as individual crystallites. This is preferably achieved by adding a flocculant to the aqueous reaction medium. A cationic organic macromolecular compound is generally used as flocculant.

The flocculent facilitates not only separation of the primary crystallites from the reaction medium (improved filterability), but also has the effect that the primary crystallites combine into preagglomerates, which are essentially the same as the agglomerates formed in the subsequent stage in terms of size, structure and association of primary crystallites. The preagglomerates are dried and subjected to intermediate calcining, which is initially conducted preferably in an inert atmosphere at about 200 to 350° C., especially at about 250° C., during which part of the template is desorbed.

Intermediate calcining can then be completed in an oxidizing atmosphere at about 500 to 600° C., in which any residual amount of template which may still be present is burned off.

The preagglomerates are generally subjected to intermediate calcining for about 1 to 20 hours in the inert atmosphere and about 1 to 30 hours in the oxidizing atmosphere.

In stage (c), the product from stage (b) is converted in an aqueous medium with a proton-containing substance, or one that yields protons when heated, for exchange of the alkali ions. For example, ion exchange can be conducted by means of a dilute mineral acid (for example, hydrochloric acid or sulfuric acid) or an organic acid (for example, acetic acid). Ion exchange preferably occurs with agitation for at least one hour at temperatures between 25 and 100° C., at least part of the alkali ions in the preagglomerates of the primary crystals being exchanged by hydrogen ions. If necessary, ion exchange can be repeated under the same conditions.

After exchange of the alkali ions in the aqueous medium, the product containing protons (H-zeolite) is separated (for example, by filtration), dried and subjected to intermediate calcining again. Intermediate calcining is conducted at temperatures from 400 to 800° C., preferably at about 600° C. over a period from 5 to 20 hours.

Instead of dilute acid, ion exchange can also be conducted with an ammonium salt solution under comparable conditions. In this case, the alkali ions are exchanged by ammonium ions. If the product so obtained is subject to intermediate calcining, ammonia is eliminated and a product containing protons is obtained.

The product obtained after intermediate calcining contains agglomerates, on the one hand, that are $\geq 500$ µm, and, on the other hand, dust fractions that are $\leq 5$ µm. An agglomerate fraction of about 5 to 500 µm is therefore separated.

This agglomerate fraction is mixed in stage (d) with the finely divided aluminum oxide hydrate, at least 95% of which is preferably $\leq 55$ µm and at least 30% $\geq 35$ µm. These values are referred in each case to the average diameter, averaged over a number of crystallites, which is defined as the average diameter of the primary crystallites. In particular, the aluminum oxide typically has the following grain size spectrum.

99% $\leq$ 90 µm
95% $\leq$ 45 µm
55% $\leq$ 25 µm.

The aluminum oxide hydrate is essentially responsible for adjustment of the pore volume of the catalyst according to the invention. The amount of finely divided aluminum oxide hydrate binder according to the invention is about 10 to 40 wt. %, referred to the total weight of the product (the mixture) of stage (d).

The finely divided aluminum oxide hydrate binder is preferably peptizable aluminum oxide, which is particularly low in Na and Fe.

It was surprisingly found that a significant improvement in catalytic properties of the catalysts according to the invention is obtained, if an acid concentration from 0.15 to 2.5 mol $H^+$/mol $Al_2O_3$, preferably from 0.20 to 1.5 mol $H^+$/mol $Al_2O_3$, and especially 0.4 to 1.0 mol $H^+$/mol $Al_2O_3$, is set for peptization of the aluminum oxide hydrate.

Peptization can be conducted, in principle, with organic or inorganic acids in a concentration range of the acid from 0.1 to 100%. For example, organic acids, like 100% acetic acid, or dilute inorganic acids, like 52% nitric acid, etc., can be used.

The product from stage (d) is subjected to final calcining. This can generally be conducted at temperatures between about 500 and 850° C. for 1 to 12 hours. However, it was surprisingly found in the context of the present invention that final calcining is conducted with particular advantage at a temperature from 660 to 850° C. for less than 5 hours, especially from 680° C. to 800° C. for 1 to 4 hours. With this relatively short final calcining at elevated temperatures, the acidity of the acid centers of the catalysts can obviously be advantageously influenced and, at the same time, the stability of the catalyst according to the invention increased. It was also found that this advantageous "intensified" final calcining exhibits positive effect on the catalytic properties of the catalysts based on aluminosilicate even in other aluminosilicate catalysts, when other (arbitrary) aluminum, alkali and silicon sources are used and arbitrary templates, as well as binders not according to the invention.

The so obtained end product, as already mentioned, can be used with particular advantage in CMO or MTP and OTO processes. However, in principle, use in other hydrocarbon conversion reactions, especially olefin to diesel (COD) methods, dewaxing methods, alkylations, conversion of paraffin to aromatic compounds (CPA), as well as related reactions, is not ruled out.

The invention is further illustrated by the following non-restricting examples.

COMPARATIVE EXAMPLE 1

A catalyst was prepared according to example 1 of EP 0 369 364 B1 with an average diameter of the primary crystallites of about 0.3 µm (Si/Al ratio 105). The method and physical and chemical properties of the product stated there are expressly included in the present description by reference.

Aluminosilicate zeolites with a primary crystallite size of <1 µm were produced according to this comparative example. The catalysts were produced using aluminum oxide as binder. The detailed procedure was as follows:

A reaction mixture was produced by intimate mixing of two solutions at room temperature in a 40 liter autoclave. The two solutions were referred to as solution A and solution B. Solution A was produced by dissolving 2218 g TPABr in 11 kg deionized water. 5000 g of a commercial silica was introduced to the solution.

Solution B was prepared by dissolving 766 g NaOH and then 45.6 g $NaAlO_2$ in 5.5 liters of deionized water. The still warm solution B was added to solution A. The autoclave was then closed and brought to reaction temperature immediately with agitation of about 60 rpm. After about 50 hours, the reaction was completed, as was apparent from the pH jump. After cooling, the autoclave was opened, the product removed from the reaction vessel and filtered. The filter cake was suspend in 40 liters of deionized water, mixed with about 5 liters of a 0.5 wt. % aqueous suspension of a commercial flocculant and decanted after agitation and settling of the solid. The described washing process was repeated until the wash water had a pH value of 7 to 8 and a Br concentration of less than 1 ppm. The suspension, in which preagglomerates of primary crystallites were apparent, which were obviously held together by the flocculant, was filtered. The filter cake was then dried for 12 hours at 120° C.

The dried filter cake was ground with a commercial granulator to a particle size of 2 mm.

The granulate was brought to 350° C. at a heating rate of 1° C./min under nitrogen (1000 Nl/h) and calcined at 350° C. for 15 hours under nitrogen (1000 Nl/h). The temperature was then raised to 540° C. at a heating rate of 1° C./min and the granulate calcined for 24 hours at this temperature in air, to burn off the remaining TPABr.

The calcined Na zeolite was suspended in a 5-fold amount of a 1 mole aqueous HCl solution and brought to 80° C. It was agitated for an hour at this temperature. About 1 liter of a 0.4 wt. % suspension of flocculant was then added and the supernatant acid was decanted off after settling of the solid. The procedure so described was repeated again.

The solid, in about 10 washing processes, was suspended in each case in 60 liters of deionized water under agitation and mixed with an average of 100 mL of 0.4 wt. % suspension of flocculant. After settling of the zeolite, the supernatant solution was decanted. When the $Cl^-$ content in the wash water was <5 ppm, the suspension was filtered off and dried for 15 hours at 120° C.

The dried H-zeolite was ground with a commercial granulator to 2 mm and brought to 540° C. under air at a heating rate of 1° C./min and calcined at this temperature in air for 10 hours.

5000 g of the calcined H-zeolite was ground by means of a laboratory mill to a particle size of about 500 µm and mixed in a double Z kneader with 1470 g of a commercial peptizable aluminum oxide hydrate with a particle size spectrum of 98 wt. %≦90 µm 95 wt. %≦45 µm and 55 wt. %≦25 µm dry for 15 minutes. 4565 mL of a 1.5 wt. % aqueous acetic acid solution (for peptization of the aluminum oxide hydrate) and 417 mL steatite oil were slowly added to this mixture.

This mixture was kneaded for about 30 minutes to plastification and extruded in a commercial extruder to molded articles with a diameter of about 1.5 mm and a length of about 3 mm. Final calcining was conducted at 650° C. for 3 hours.

The analysis values and physical and chemical properties of the product are shown in Table I.

COMPARATIVE EXAMPLE 2

A catalyst was prepared according to example 4 of DE-A-24 05 909, but in which no treatment with nickel nitrate, i.e., no Ni exchange, occurred. The production method and physical and chemical properties of the product, stated in DE-A-24 05 909 under example 4, are expressly included in the present description by reference.

EXAMPLE 1

A catalyst was prepared as described in comparative example 1, conversion being interrupted as soon as the average particle diameter of the primary crystallites was at 0.03 µm. Calcining and ion exchange also occurred according to comparative example 1.

EXAMPLE 2

A catalyst was prepared as described in example 1, in which the ratio of $SiO_2$ and $NaAlO_2$ was varied with the same total molarity of these compounds, so that the Si/Al ratio of the catalyst was at 31. Conversion of the reaction mixture was interrupted as soon as the primary crystallite diameter was 0.03 µm.

The physical and chemical properties of the catalyst, of comparative to example 1 and of examples 1 and 2, are summarized in Table I.

TABLE I

| Beispiel | Vergleichebeispiel 1 | 1 | 2 |
|---|---|---|---|
| Molverhaltnis Ausgangsstoffe | | | |
| $SiO_2$ | 100 | 100 | 100 |
| $NaAlO_2$ | 0.67 | 0.67 | 2.21 |
| NaOH | 23 | 23 | 23 |
| TPABr | 10 | 10 | 10 |
| $H_2O$ | 1100 | 1100 | 1100 |
| kristallisationsdaten | | | |
| Temperatur (° C.) | 130 | 130 | 130 |
| Zeit (h) | 50 | 23 | 29 |

TABLE I-continued

| Beispiel | Vergleiche-beispiel 1 | 1 | 2 |
|---|---|---|---|
| Kristallinitat (%) | 100 | 100 | 100 |
| Primarkristallitgröbe (μm) | 0.3 | 0.03 | 0.03 |
| Phys. und chem. Eigen-schaften des Katalysators | | | |
| Si/Al Atomverh. | 105 | 105 | 31 |
| BET-Oberfläche (m²/g) | 366 | 385 | 393 |
| Porenvolumen (cm³/g) | 0.51 | 0.46 | 0.55 |
| Poren ≧ 80 nm (%) | 21.1 | 20.7 | 8.2 |
| Poren 14–80 nm (%) | 68.0 | 69.2 | 77.3 |

Headings

Example

Comparative example 1

Left

Molar ratio initial substances

Crystallization data
  Temperature
  Time
  Crystallinity
  Primary crystallite size Physical and chemical properties of the catalyst
  Si/Al atomic ratio
  BET surface
  Pore volume
  Pores ≧ 80 nm
  Pores 14–80 nm

APPLICATION EXAMPLE

This application example demonstrates the advantages of the catalyst according to the invention with reference to catalytic data of the CMO process (conversion of methanol to olefins) in an isothermal fixed bed reactor.

The experiments were run as in application example 1 of EP 0 369 364, whose disclosure in this respect is included in the present description by reference. To summarize, the methanol/water feed (1 g/1 g) with an LHSV of 1 (l/(l×h)), i.e., liter of total feed per liter of catalyst and per hour, was passed over 300 cm³ CMO catalyst in an isothermal fixed bed tubular reactor at a pressure of 1 bar after passing through an isothermal fixed bed tubular reactor for partial conversion of methanol to dimethyl ether. Conversion of methanol was maintained at almost 100%. At a specified value (conversion EOR, %), the reaction was interrupted and the catalyst regenerated.

The gas phase and liquid phase at the output of the CMO catalyst reactor were determined with the usual gas chromatographic analysis methods. The distribution of hydrocarbons is summarized in Table II, together with other relevant data.

TABLE II

| Katalysator | Vergleichs-beispiel 1 | Vergleichs-beispiel 2 | Beispiel 1 |
|---|---|---|---|
| Bindemittel | Aluminiumoxid | Aluminiumoxid | Aluminiumoxid |
| Primarkristallitgröbe (μm) | 0.3 | 0.05–0.07 | 0.03 |
| Temperatur (° C.) | 400 | 415 | 395 |
| Druck (bar) | 1 | 1 | 1 |
| LHSV (l/l × h) | 1 | 1 | 1 |
| MeOH/H₂O (g/g) | 1 | 1 | 1 |
| Dauer 1. Zyklus (h) | 927 | 548 | 1000 abgebr. |
| Dauer 2. Zyklus (h) | 2000 abgebr. | 415 | 2000 abgebr. |
| 1. Zyklus Mittelwerte (Gew. %) | | | |
| C₁–C₄ Paraffine | 10.5 | 9.1 | 9.9 |
| C₂–C₄ Olefine | 51.9 | 50.8 | 60.8 |
| C₃ Olefin | 24.8 | 22.3 | 34.4 |
| C₅⁺ Gasolin | 37.6 | 40.1 | 29.3 |
| Konversion EOR (%) | 99.7 | 99.5 | 100 abgebr. |
| 2. Zyklus Mittelwerte (Gew. %) | | | |
| C₁–C₄ Paraffine | 7.5 | 9.8 | 9.0 |
| C₂–C₄ Olefine | 54.8 | 48.0 | 63.8 |
| C₃ Olefin | 26.2 | 19.9 | 36.1 |
| C₅⁺ Gasolin | 37.7 | 42.2 | 27.2 |
| Konversion EOR (%) | 100 abgebr. | 98.4 | 100 abgebr. |

EOR = end of run;
abgebr. = abgebrochen

Headings

Catalyst

Comparative example 1

Comparative example 2

Example 1

Left

Binder

Primary crystallite size

Temperature

Pressure

LHSV

MeOH/H$_2$O

Duration of 1$^{st}$ cycle

Duration of 2$^{nd}$ cycle

1$^{st}$ cycle average value (wt. %)
  $C_1$–$C_4$ paraffin
  $C_2$–$C_4$ olefin
  $C_3$ olefin
  $C_5^+$ gasoline Conversion EOR 2$^{nd}$ cycle average value (wt. %)
  $C_1$–$C_4$ paraffin
  $C_2$–$C_4$ olefin
  $C_3$ olefin
  $C_5^+$ gasoline Conversion EOR Other columns abgebr.=interrupted EOR=end of run;

Table II clearly shows the improved selectivity of the catalyst according to example 1 in production of $C_2$–$C_4$ olefins, as well as the very good lifetime of the catalyst according to the invention. The catalysts (also the catalyst according to the invention) were regenerated after completion of the first cycle, by initially shutting off the MeOH stream. Nitrogen was then supplied to drive out the remaining MeOH. Finally, oxygen in gradually higher concentrations was added to the nitrogen, in order to burn off the hydrocarbons deposited on the catalysts. The temperature of the catalysts was always kept below 480° C. Regeneration of the catalysts was completed when the oxygen content of the nitrogen stream at the input and output of the catalyst bed was the same.

It should also be noted that the catalyst according to example 1 exhibits higher conversion values at 395° C. than the comparative catalysts that were tested at higher temperatures.

It was also surprisingly found that the selectivity of the catalyst according to the invention in the production of $C_2$–$C_4$ olefins, as well as its lifetime, could also be significantly increased by running peptization of the employed aluminum oxide hydrate with an increased acid concentration of more than about 2.0 mol $H^+$/mol $Al_2O_3$. The aforementioned properties of the catalysts according to the invention could also be further improved by shortened final calcining, conducted at higher temperatures (for example, 700° C. for 3 hours).

During use of other comparative catalysts that had either an Si/Al ratio or a primary crystallite size outside of the values stated in claim 1, it was found that the selectivity for propylene is much lower than during use of the catalyst according to example 1.

The invention claimed is:

1. A crystalline aluminate catalyst of the pentasil type comprising primary aluminosilicate crystallites with an average diameter from about 0.01 μm to less than 0.1 μm wherein at least about 20% of the crystallites are combined to form agglomerates with a size from about 5 μm to about 500 μm, wherein the crystallites and the agglomerates are bonded together by an aluminum oxide binder, wherein the catalyst has a BET surface area from about 300 to about 600 $m^2/g$ and a pore volume from about 0.3 to about 0.8 $cm^3/g$, and wherein, the amount of the finely divided aluminum oxide binder comprises from about 10 to about 40 wt. %, of the total weight of the aluminosilicate and binder.

2. The catalyst of claim 1, wherein the aluminosilicate is in $H^+$-form.

3. The catalyst of claim 1, wherein the aluminum oxide is produced from a peptizable aluminum oxide hydrate.

4. The catalyst of claim 1, wherein the crystalline aluminosilicate has an Si/Al atomic ratio from about 50 to about 250.

5. The catalyst of claim 1, wherein the crystalline aluminosilicate has an Si/Al atomic ratio from about 10 to about 100.

6. The catalyst of claim 1, wherein the primary crystallites have an average diameter from about 0.01 μm to about 0.06 μm.

7. The catalyst of claim 1, wherein the primary crystallites have an average diameter from about 0.015 μm to about 0.05 μm.

8. The catalyst of claim 1, wherein at least about 10% of the pores of the catalyst have a diameter from about 14 to about 80 nm.

9. The catalyst of claim 1, wherein at least about 60% of the pores of the catalyst have a diameter from about 14 to about 80 nm.

10. The catalyst of claim 3, wherein at least about 95% of the particles of the peptizable aluminum oxide hydrate have an average diameter less than about 55 μm.

11. The catalyst of claim 1, wherein the finely divided aluminum oxide binder is obtained by hydrolysis of aluminum trialkyls or aluminum alcoholates.

12. A process for producing the catalyst of claim 1 comprising
    a) producing an alkaline aluminosilicate gel in an aqueous reaction containing a silicon source, an aluminum source, an alkali source, and a template at an elevated temperature and converting the gel to primary aluminosilicate crystallites by interrupting the reaction when the primary crystallites have an average diameter from about 0.01 μm to less than 0.1 μm;
    b) separating the primary crystallites as preagglomerates from the reaction medium;
    c) drying and calcining the preagglomerates;
    d) reacting the calcined preagglomerates with a substance containing protons or donating protons;
    e) separating, drying and calcining an agglomerate fraction obtained by the separation of the preagglomerates having a size from about 5 μm to about 500 μm;
    f) mixing the agglomerate fraction with a finely divided aluminum oxide hydrate; and
    g) calcining the mixed product.

13. The process of claim 12, wherein the calcining of process step (g) is conducted at a temperature from about 500° C. to about 850° C. for about 1 to about 12 hours.

14. The process of claim 12, wherein the substance containing protons is an acid and wherein the acid concentration is from about 0.15 to about 2.5 mol $H^+$/mol $Al_2O_3$.

15. The process of claim 12, wherein a source for at least a portion of the reactants of the aqueous reaction containing a silicon source, an aluminum source, an alkali source and a template is a mother liquor of a previous reaction process for production of the catalyst.

16. The process of claim 12, wherein the template comprises tetrapropylammonium hydroxide or tetrapropylammonium bromide.

17. The process of claim 12, wherein the template comprises a mixture of alumina or an organic amine and another organic compound selected from the group of alcohols.

18. The process of claim 12, wherein the pH of the reaction of step (a) is from about 10 to about 13, and wherein the temperature of that reaction is from about 90 to about 190° C.

19. The process of claim 12, wherein the alkaline aluminosilicate reaction is conducted at an agitation speed no greater than 900 rpm.

20. The process of claim 12, wherein the primary crystallites of process step (b) are separated by the addition of a flocculent.

21. The process of claim 12, wherein the calcining process of step (c) is conducted in an inert atmosphere at a temperature from about 200 to about 350° C. and then in an oxidizing atmosphere at a temperature from about 500 to about 600° C.

22. The process of claim 12, wherein the temperature of the calcining step (e) is from about 400 to about 800° C. for about 5 to about 20 hours.

23. The process of claim 12, wherein the primary aluminosilicate crystallites are produced without addition of an acid.

* * * * *